United States Patent [19]

Skoda

[11] Patent Number: 4,586,161

[45] Date of Patent: Apr. 29, 1986

[54] PERMANENT THERMO-MAGNETIC RECORDING OF BINARY DIGITAL INFORMATION

[75] Inventor: Raymond E. Skoda, Schenectady, N.Y.

[73] Assignee: General Electric Company, Schenectady, N.Y.

[21] Appl. No.: 493,494

[22] Filed: May 11, 1983

[51] Int. Cl.[4] .............................................. G11C 11/42
[52] U.S. Cl. ..................................... 365/122; 360/59; 350/378
[58] Field of Search ..................... 365/122, 10; 360/59; 350/374, 375, 378; 369/13

[56] References Cited

U.S. PATENT DOCUMENTS

| | | | |
|---|---|---|---|
| 3,631,415 | 12/1971 | Aagard et al. | 365/122 |
| 3,651,504 | 3/1972 | Goldberg et al. | 365/122 |
| 3,949,387 | 4/1976 | Chaudhari et al. | 365/128 |
| 3,965,463 | 6/1976 | Chaudhari et al. | 365/10 |

*Primary Examiner*—James W. Moffitt
*Attorney, Agent, or Firm*—Geoffrey H. Krauss; James C. Davis, Jr.; Marvin Snyder

[57] ABSTRACT

A thermo-magnetic method for recording of a bit of information in each domain of an amorphous alloy thin-film layer supporting small stable domains. Each domain in the recording layer is first magnetized in a first direction, corresponding to a first binary state, by exposure to a saturation magnetic field. The remaining binary state is temporarily or permanently recorded in a particular domain by heating (to a lower or higher temperature) that domain volume of the recording layer above a predetermined temperature, but less than the melting temperature of the layer material, and thereafter cooling the heated domain in the presence of a bias magnetic field of direction opposite to, and magnitude less than, the saturation field. The binary state of each domain is read by interrogation with a beam of energy and utilization of differential effects between the interrogation beam and the direction of the magnetic field in the interrogated domain.

15 Claims, 2 Drawing Figures

PERMANENT THERMO-MAGNETIC RECORDING OF BINARY DIGITAL INFORMATION

BACKGROUND OF THE INVENTION

The present invention relates to information storage and, more particularly, to a novel method for permanent thermo-magnetic recording and storage of binary digital information.

It is known to store data by magnetically recording each bit of data in a magnetic medium. To obtain the highest density of stored information, the area of each magnetic domain must be as small as possible. Previously, methods for thermo-magnetically recording binary digital information with high density have not been practical. With the advent of high-coercivity materials to support magnetic domains having diameters on the order of several microns, as disclosed and claimed in co-pending application Ser. No. 493,495 and now abandoned (filed on even date herewith, assigned to the assignee of the present application, and incorporated herein in its entirety by reference), the possibility for high-density digital information storage is present.

It is desirable to provide methods for permanently thermo-magnetically recording digital data in a thin-film medium supporting relatively small and stable magnetic domains.

BRIEF DESCRIPTION OF THE INVENTION

In accordance with the invention, digital information is thermo-magnetically stored in a thin-film layer of a magnetic recording material. The material can be an amorphous alloy of at least one rare-earth element and at least one transition-metal element, or a material such as manganese bismuth, manganese copper bismuth, manganese aluminum germanium, platinum cobalt and the like. In presently preferred embodiments, wherein the thin-film recording layer is formed of such R.F. sputtered amorphous alloys as gadolinium cobalt (GdCo), gadolinium terbium cobalt (GdTbCo), gadolinium terbium iron (GdTbFe), terbium iron (TbFe), dysprosium iron (DyFe) or gadolinium iron yttrium (GdFeY), a bit of binary information is stored by: temporarily subjecting the magnetic recording layer to a saturation field, in a first direction substantially normal to the plane thereof, to provide a residual magnetic field in each layer domain identified with one information bit, whereby a first binary state is defined; then subjecting the layer to a bias magnetic field, of magnitude less than the saturation field magnitude and direction opposite to the direction of the saturation field; heating a domain, in which an information bit of the remaining binary state is to be stored, while the bias magnetic field is present; and cooling the heated domain while the bias magnetic field is still present, to induce in that domain a net magnetic field of direction opposite to the residual magnetic field. Each data bit is permanently stored if the temperature provided in the domain, during the data storage interval, is greater than a predetermined lower temperature (above about 200° C. for a GdCo storage layer) but less that the layer melting temperature (about 1325°±25° C. for an alloy of about 20–30% Gd and 80–70% Co), the induced net magnetic field is permanently stored and cannot be subsequently erased by exposure to high magnitude temperatures or magnetic fields.

The digital state of the bit of data stored in each domain is read by utilizing the effect of that one of the oppositely-directed domain fields upon an interrogating beam of energy.

In a presently preferred embodiment, wherein the reading energy beam is a beam of light energy, an electro-optical effect (such as the Kerr effect for a reflected interrogation beam, or the Faraday effect for a transmitted interrogation beam) inducing different directions of rotation for a planar-polarized beam is utilized.

Accordingly, it is an object of the present invention to provide a novel method for permanently thermo-magnetically recording digital information in an amorphous alloy media.

This and other objects of the present invention will become apparent upon consideration of the following detailed description, when read in conjunction with the drawings.

DETAILED DESCRIPTION OF THE INVENTION

Figure 1:
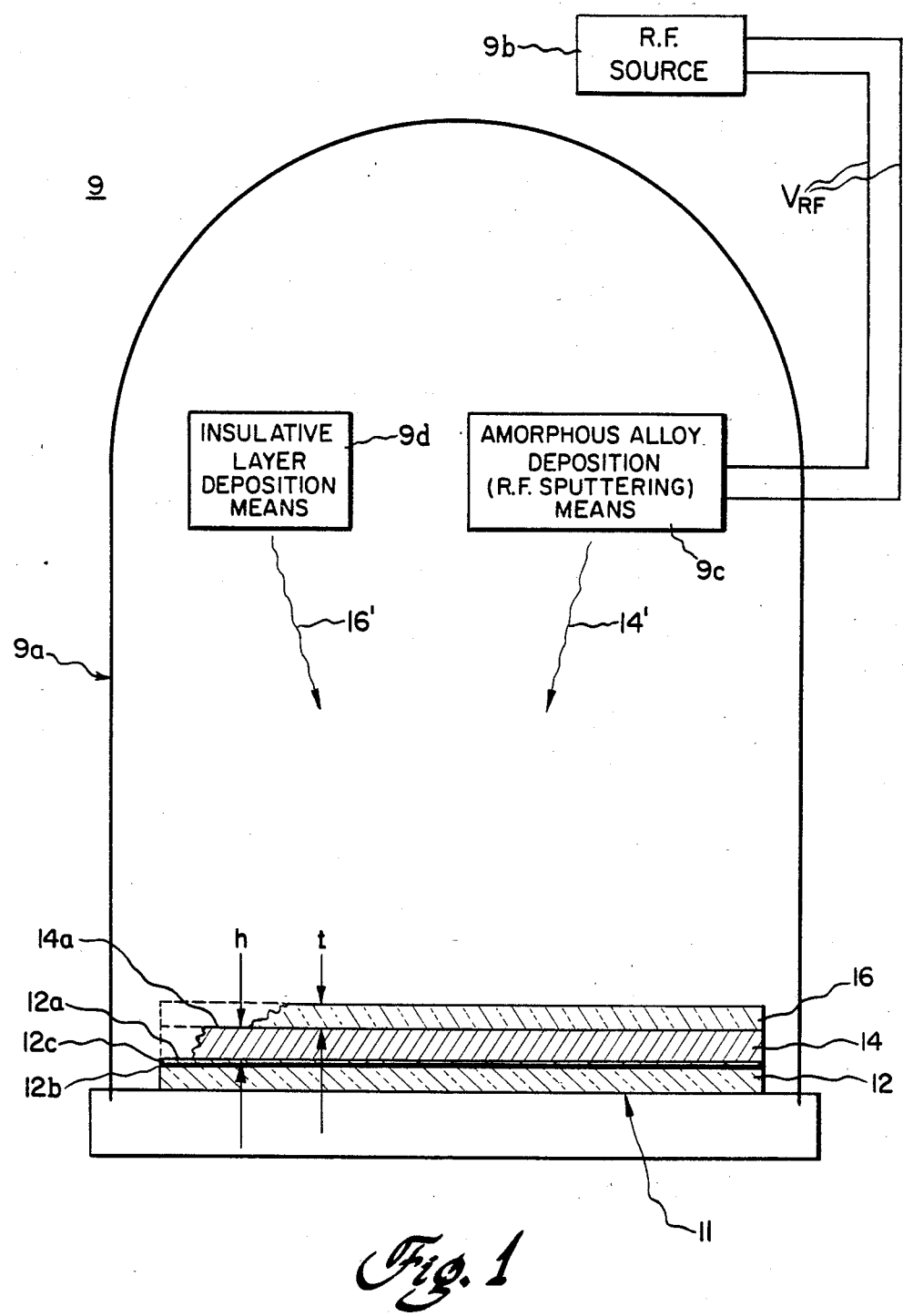
FIG. 1 is a somewhat schematic representation of apparatus for deposition of an amorphous alloy upon a substrate to form a thermo-magnetic recording disk used in the present invention.

My invention provides information recording by causing a local increase in the temperature of a thin-film layer of magnetic recording material, subjected to a bias magnetic field, to cause the magnetization direction in that heated area to change with respect to the direction of a local magnetic field previously provided in that domain. The recording layer is fabricated of one of a class of amorphous alloys as further described and claimed in the aforementioned application Ser. No. 493,495. As detailed therein, one preferred amorphous alloy may have at least one transition-metal element and at least one rare-earth element, in which at least two antiferro-magnetically-coupled magnetization sublattices cah be made opposite and equal at some compensation temperature such that the net magnetization goes to zero. These materials exhibit a coercive force which tends toward infinity at the compensation point and decreases monotonically as the temperature increases above that compensation temperature. By heating materials of this class of amorphous alloys to temperatures well above their compensation temperatures in the presence of a small magnetic field, the magnetization of the heated region is caused to assume the direction of the applied field; after the heated region cools, the magnetic parameters of my novel materials are such that a magnetic domain is created which is stable and neither expands nor collapses.

It has been generally recognized that increases in the magnetic coercive force of a thin-film magnetic material will improve the stability of magnetic domains in that material. However, it has frequently been found that there is inadequate coercivity to stabilize relatively small domains, having diameters no larger than several microns. Thus, although the desired magnetic domains may form while the desired domain volume of material is heated, the desired domains tend to collapse when the material cools. It is known that it is possible to form stable reverse domains of diameters less than several microns in materials with a zero or very small coercivity, if the recording layer material has, in the presence of a stabilizing bias field, the correct values of magnetic anisotropy, magnetization and exchange energy constant. Such materials will support bubble domains with dimensions down to a specific critical, or collapse, diameter which is dependent upon the film thickness, exchange energy constant, magnetization and magnetic anisotropy values. These reverse domains can be formed dynamically in the material, but will collapse when the stabilizing bias field is removed.

The thermo-magnetic recording materials of the aforementioned application allow domains with very small dimensions, which are stable without a bias field, to be recorded by my methods, to allow storage of large amounts of information. In such thermo-magnetic recording material, it is not only desirable to have high coercivity, but it is also desirable to have the ability to choose the other magnetic parameters such that the collapse diameter of domains formed in the recording material is very small. If suitable selection of the other magnetic parameters is made, somewhat lower coercivity values can be utilized and still provide stable domains.

The coercive force $H_c$ of the magnetic material acts to provide the required stability in the chosen thermo-magnetic recording alloys; in contradistinction, in magnetic bubble applications, the domain stability must be responsive to the applied H field. Because the coercive force $H_c$ always acts to oppose domain wall motion (and for a small domain with dimensions smaller than the critical collapse diameter will act to prevent collapse), the thickness h of the recording material film can be made small compared to the domain diameter d for thermo-magnetic recording applications. Thus, high coercivity can be achieved in a thermo-magnetic recording material having a compensation point near room temperature and a relatively low magnetization M. The amorphous alloy recording thin films are formed of a material having both moderate coercivity along with a moderate value of exchange constant A, to allow operation over an extended temperature range and still providing adequate magneto-optical signal-to-noise ratios.

The low anisotropy and high coercivity recording thin-film layer is specifically formed of an amorphous alloy of at least one rare-earth element and at least one transition-metal element and is deposited by a presently preferred R.F. sputtering process, with either very small R.F. bias, of less than about 60 volts amplitude, or with very large R.F. bias, typically greater than about 200 volts, during the sputtering deposition. Films of amorphous alloys such as gadolinum cobalt (GdCo) and gadolinum terbium cobalt (GdTbCo) are presently preferred, with films of gadolinum terbium iron (GdTbFe), terbium iron (TbFe) and the like being potentially useful in certain applications. The transition metal utilized may be any of the Group VIII metals, preferably of the fourth period for reducing recording material costs. The rare-earth elements of the sixth period may be utilizable.

I have found that amorphous alloys of the rare-earth/transition-metal elements, deposited with very small or very large R.F. bias as described and claimed in the aforementioned application Ser. No. 493,495, support thermo-magnetic storage domains having diameters on the order of 0.5 to 3 micrometers; films prepared utilizing typical moderate bias conditions (between about 60 volts and about 200 volts) do not appear to support domains of such small diameter.

Referring now to FIG. 1, a recording disk 11 is fabricated by placing a thin disk substrate 12 of a non-magnetic material, such as glass, ceramic, plastic and the like, in the isolation means 9a, e.g. a vacuum chamber, of a deposition means 9. The substrate 12 can also be of the type having, on surface 12a, a reflective coating 12b and subsequently overlaid with a thin layer 12c of a protective material, such as silicon dioxide and the like. Deposition means 9 is of any type known to the art as suitable for depositing a thin layer 14 of the recording medium upon the disk substrate surface 12a; illustratively, for depositing a layer 14 of GdCo recording media, an R.F. sputtering means 9c is utilized. The gadolinium and cobalt sources, either separated or mixed, as required, are introduced into vacuum envelope 9a and an associated R.F. source 9b is energized to provide a radio frequency voltage $V_{RF}$, of the afore-described magnitude, to sputtering means 9c. The alloy-constituent molecules 14' are deposited on surface 12a. Means 9b and 9c are operated until a layer 14 (preferably of about 20–30% Gd and about 80–70% Co, if GdCo is used) is deposited to the required thickness h, typically between 100 Angstroms and 5000 Angstroms, with a thickness h of about 500 Angstroms being preferred. Thereafter, and essentially without breaking the vacuum in isolation means 9a, additional apparatus 9d within means 9a, and forming part of the overall deposition means 9, is utilized to provide a layer 16, of thickness t, of a non-magnetic and substantially optically-transparent material upon the free surface 14a of the magnetic media layer. Illustratively, layer 16 is of silicon dioxide, fabricated to a thickness on the order of 1000 Angstroms, by R.F. sputtering beam 16' deposition methods well known to the art. I have found that thickness t of layer 16 should advantageously be selected to be about one-quarter wavelength of the light beam being used to read the information (as explained hereinbelow), as corrected for the refractive index of the layer 16 material. Layer 16 serves to protect the magnetic recording layer surface 14a and, if the aforementioned thickness conditions are observed, serves to enhance data readout (which readout is accomplished as hereinbelow explained).

After passivation of the recording layer 14 surface, by layer 16, the recording disk 11 is removed from apparatus 9 and may be stored until information is to be recorded thereon.

Figure 2:
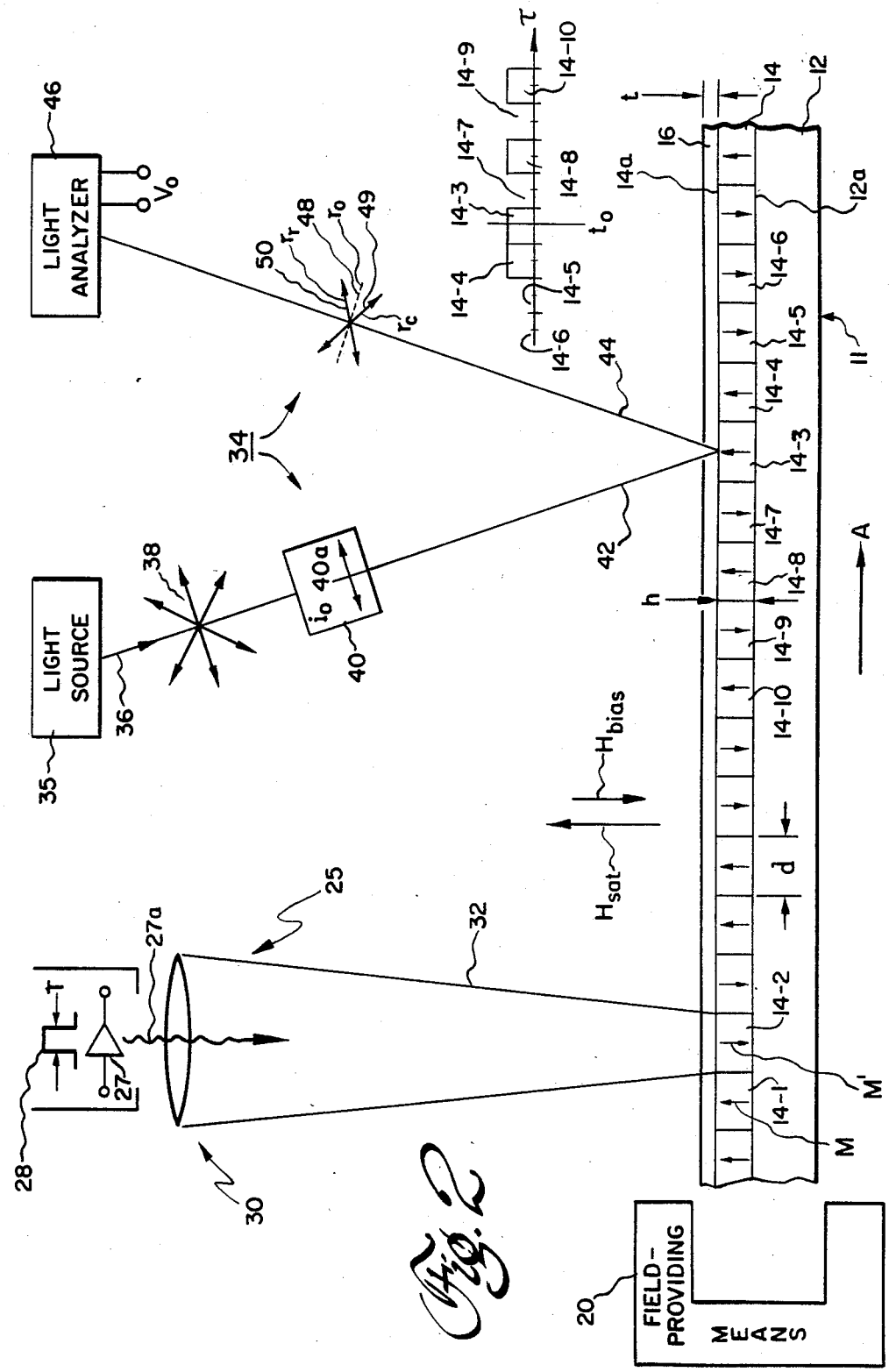
FIG. 2 is a side view of a portion of the magnetic recording disk, illustrating the manner in which information is written into and read out of the disk, in accordance with the principles of the present invention.

FIG. 2 illustrates the recording of binary-coded information on disk 11, in accordance with the presently preferred embodiment of my method. Means 20 first subjects the disk to a saturating magnetic field of magnitude $H_{sat}$ (e.g. of about 1000–2000 Oersteds) which is greater than the coercive force of layer 14 (having a coercive force $H_c$ in the range of about 300–1500 Oersteds). The saturation field has a first field direction with respect to the recording film surface 12a, e.g. upward, from substrate 12 to protective film 16. Upon removal of the saturation field $H_{sat}$, each domain area 14-N (where $1 \leq N \leq X$ and X is at least 10 in the illustrated embodiment) has a residual magnetic moment M in the direction of saturation field $H_{sat}$. The direction of the M vector establishes a first binary condition, e.g. as in domain 14-1. The remaining binary condition is provided by establishing a magnetization M' of opposite direction (to the direction of the $H_{sat}$) in a particular domain 14-N.

The M' magnetization of a domain, e.g. domain 14-2, is recorded by heating that domain to a temperature less than the melting temperature (e.g. on the order of 1300° C.) of the material, e.g. GdCo, of the recording film 14, while subjecting the film to a bias magnetic field $H_{bias}$, which may be provided by the same field-providing means 20. The bias field vector has a direction opposite to the direction of the saturation field $H_{sat}$, and has a magnitude $|H_{bias}|$ (e.g. about 50–500 Oersteds) less than the saturation magnitude $|H_{sat}|$ and greater than the actual value of the temperature-dependent $H_c$, which is realized when the domain is heated, i.e. the domain $|H_c|$ is reduced, by heating, to a value less than $|H_{bias}|$.

In my presently preferred embodiment, the localized heating of a domain, e.g. domain 14-2, is provided by focusing of light energy thereon from writing source means 25. Means 25 includes a laser diode 27 for emitting a pulsed light beam 27a responsive to an electrical current pulse 28, of pulse width T. The emitted beam is focussed by an optical means 30. The focussed beam 32 is transmitted through the transparent film 16 and impinges on the area of recording film surface 12a defining the desired domain, e.g. domain 14-2. The impingent energy heats that portion of the recording film 12 in the desired domain; the coercive force of the film 12 is reduced below the net magnetic field at the heated site. After the end of the laser pulse, of duration T, the recording film cools to room temperature, in the presence of the net magnetic field. Since the net magnetic field is the result of the temperature-reduced film magnetization distribution and the bias field, the magnitude $|H_{bias}|$ of the bias field can be set to a desired value, e.g. about twice the magnitude of the film coercive force $H_c$ at the elevated recording temperature, and the cooling domain has a magnetization M' in the direction of the net magnetic field.

The recorded domains having the magnetization M' therein may be erased by a high saturation field $H_{sat}$, which annihilates the domains, if the domains were recorded by heating to a domain temperature from about 100° C. to about 200° C., as might be provided by subjecting each domain, of diameter about 1 micron, to a single optical recording pulse having a duration T from about 10 nanoseconds to about 1 microsecond, to heat a domain area from about one-quarter micrometer-squared to about 2 micrometers-squared. A non-erasable recording with permanent magnetic domains is provided by heating the domain area to a much higher temperature than that needed for providing erasable domains. The permanent recording temperature at each domain must be greater than about 200° C. but less than the melting temperature of the recording film 14. For the same laser beam power, e.g. between about 5 milliwatts and about 15 milli-watts, a single pulse of duration T of about 10 microseconds (or a chain of sequential 1 microsecond pulses) can be utilized with a domain having a diameter d between about 2 microns and about 3 microns.

After recording, the recorded magnetic disk 11 can be stored until read-out of the stored data is desired. A non-permanently recorded disk can, after being erased by a saturation field, be re-recorded with information stored in either the non-permanently-recorded or permanently-recorded modes, and that the subsequent permanency of recording will depend upon the temperature to which the domain is subjected during the recording process.

The recorded disk is read by utilization of an effect producing different output results dependent upon the direction of magnetization in each domain 14-N. In the presently preferred embodiment, incident light is utilized to read the stored information by an appropriate optical effect, e.g. by the use of the Faraday effect for light transmitted through the disk, or by use of the Kerr effect for light reflected from the disk, through transparent layer 16. As previously mentioned, reading of the disk by reflected light (using the Kerr effect) is enhanced by having layer 16 deposited with a quarter-wavelength thickness, as corrected for the refractive index of the layer 16 material. Illustratively, Kerr-effect reading apparatus 34 includes a light source 35 emitting a beam 36 of light having random-polarization vectors 38. Beam 36 is passed through a plane-polarizing means 40 and the resulting beam has a single polarization vector 40a. The plane-polarized beam 42 impinges upon disk 11 and passes through the substantially transparent protective layer 16 thereof. Incident beam 42 is reflected from the thin-film recording layer surface 12a, passes through layer 16 and is transmitted as reflected beam 44 to a light analyzer means 46. Means 46 provides an output voltage $V_0$ in one of two binary states, dependent upon the rotation of polarization in the reflected beam 44, relative to the polarization $i_o$ of the incident beam. The Kerr effect causes the reflected plane of the polarization vector, which would be a complementary planar polarization $r_0$ vector if the reflecting film region were to be unmagnetized, to have either a planar polarization $r_c$ vector 49 rotated in a first direction for reflection from the surface of a magnetized domain having M magnetization therein, or a plane polarization $r_r$ vector 50 rotated in the opposite direction for reflection from the surface of a magnetized domain having the M' magnetization in the opposite direction. If the magnetizations M and M' are of opposite direction and substantially equal magnitudes, the degrees of rotation of vectors 49 and 50 will be substantially equal in the substantially opposite directions.

As illustrated, for a disk traveling in the direction of arrow A, the interrogation beam 42 is, at time $t_0$, reflected from the surface of domain 14-3, having an M magnetization therein; the reflected beam 44 has a rotated polarization $r_c$ vector 49 and the analyzer means provides a logic 1 output responsive to receipt thereof. The previously-interrogated domains 14-4 through 14-6, respectively having the magnetizations M, M' and M' were read, at times immediately prior to time $t_0$, as binary 1, 0 and 0 data bits. Similarly, as the disk continues to turn, beam 42 interrogates domain 14-7 and the M' magnetization therein causes the reflected beam to have the polarization rotation $r_r$ imparted thereto, whereby analyzer means 46 provides a binary 0 output. Similarly, for subsequent positions of the interrogation beam at domains 14-8 through 14-10, for sequential times after time $t_0$, the reflected beam 44 has the respective polarization rotations vectors $r_c$, $r_r$ and $r_c$ and the analyzer means output voltage $V_0$ is respectively in the binary 1, 0 and 1 states responsive thereto.

While presently preferred embodiments have been described in detail herein, many modifications and variations will now become apparent to those skilled in the art. It is my intent, therefore, to be limited only by the scope of the appending claims and not by the details and instrumentalities described by way of explanation of exemplary embodiments herein.

What I claim is:

1. A method for non-erasable storage of binary digital information, comprising the steps of:
   (a) providing a planar thin-film recording layer of a thermo-magnetic recording material;
   (b) temporarily subjecting the layer to a bias magnetic field, of magnitude less than a saturation field magnitude and passing through at least a domain in which a bit of information is to be recorded;
   (c) temporarily heating the layer in at least the area thereof defining a domain in which a binary state is to be recorded, while the bias magnetic field is present, to a temperature within a range predetermined to cause a bit of information to be substantially permanently stored in that domain; and
   (d) cooling the heating domain in the presence of the bias magnetic field, to induce in that domain a net magnetic field of direction aligned with the bias magnetic field.

2. The method of claim 1, wherein step (a) further comprises the step of: temporarily subjecting the recording layer to a saturation field, in a first direction substantially normal to the plane of the layer, to provide a residual magnetic field defining a first binary state in each of at least one magnetic domain in the layer; step (b) further comprises the step of: providing the bias magnetic field in a direction opposite to the direction of the saturation field; and steps (c) and (d) are utilized only for each domain in which a remaining binary state is to be substantially permanently recorded.

3. The method of claims 1 or 2, further comprising the steps of: interrogating at least one layer domain with a beam of energy; and analyzing the effect of the magnetic field in the interrogated domain upon the beam of energy to read the state of the bit of digital information stored in the interrogated domain.

4. The method of claim 3, wherein the interrogating energy beam is a beam of light energy.

5. The method of claim 4, further comprising the step of: substantially planar-polarizing the interrogating light beam prior to the impingement of that beam upon the recording layer.

6. The method of claim 5, wherein the impinging light beam is reflected from the magnetic layer prior to the analyzing step, and further comprising the steps of: fabricating a layer of a substantially transparent material upon that surface of the recording layer from which the interrogating light beam is to be reflected; and establishing the thickness of the substantially transparent layer to be about one-quarter of the wavelength, corrected for the refractive index of the material of the substantially transparent layer, of the interrogating light beam.

7. The method of claim 5, wherein the analyzing step includes the steps of: determining the direction of rotation of the substantially planar polarized light reflected from the recording layer; and assigning different ones of the binary states to opposite directions of rotation thereof, with respect to a reference polarization plane.

8. The method of claim 5, wherein said recording layer includes a multiplicity of domains, each having a different bit of digital information stored therein, and including the step of: sequentially directing light energy upon a sequential portion of the multiplicity of domains for at least one of the heating and interrogation steps.

9. The method of claim 1, wherein the predetermined temperature range extends from about 200° C. to a temperature less than the melting temperature of the recording layer material.

10. The method of claims 1 or 2, wherein the heating step comprises the step of focussing a beam of light energy upon the domain in which a bit of digital information is to be recorded.

11. The method of claim 10, wherein the light beam is focussed to heat a domain of diameter in the range from about 0.5 micron to about 3 microns.

12. The method of claim 11, wherein the focussed light beam is pulsed for a time interval of between about 10 nanoseconds and about 50 microseconds to heat the domain being recorded.

13. The method of claims 1 or 2, wherein the saturation field is provided at a magnitude of between about 1000 Oersteds and about 2000 Oersteds.

14. The method of claim 13, wherein the bias magnetic field is provided at a magnitude of between about 50 Oersteds and about 500 Oersteds.

15. The method of claims 1 or 2, wherein the recording layer is provided by R.F. sputtering an amorphous alloy of at least one rare-earth element and at least one transition-metal element on a non-magnetic substrate.

* * * * *